United States Patent [19]

Cameron et al.

[11] Patent Number: 5,167,886
[45] Date of Patent: Dec. 1, 1992

[54] HOT PRESSING DENSIFICATION AID FOR ALUMINA

[75] Inventors: Craig P. Cameron, Ellicott City, Md.; Roy W. Rice, Alexandria, Va.

[73] Assignee: W. R. Grace & Co.-Conn., New York, N.Y.

[21] Appl. No.: 752,112

[22] Filed: Aug. 29, 1991

[51] Int. Cl.$^5$ .............................................. C04B 35/10
[52] U.S. Cl. ................................... 264/63; 264/332; 264/338; 501/98; 501/127
[58] Field of Search ................ 264/332, 63, 338; 501/98, 127

[56] References Cited

U.S. PATENT DOCUMENTS

| | | | |
|---|---|---|---|
| 2,745,763 | 5/1956 | Veltz | 501/98 |
| 4,041,123 | 8/1977 | Lange | 264/332 |
| 4,217,948 | 8/1980 | Merzhanov | 264/60 |
| 4,343,909 | 8/1982 | Adams | 501/98 |

OTHER PUBLICATIONS

Cremer, Herbert W., Chemical Engineering Prentice, vol. 1 1956, Academic Press Inc. Pub., New York, pp. 93-95.
The Condensed Chemical Dictionary, 6th Edition, Reinhold Pub., Corp., New York, 1961, p. 106.

Primary Examiner—James Derrington
Attorney, Agent, or Firm—Steven Capella

[57] ABSTRACT

A boron compound, capable of forming boron oxide on hot pressing in an oxygen-containing atmosphere, is used as a densification aid for hot pressing of alumina-containing ceramics in oxygen-containing atmospheres. The boron compound may be incorporated into the material to be hot pressed or may be applied to the surface of that material. Air may be used as the hot pressing atmosphere. The alumina-containing ceramic to be hot pressed may be formed by reaction processing techniques. Boron nitride is a preferred boron compound.

20 Claims, No Drawings

HOT PRESSING DENSIFICATION AID FOR ALUMINA

This invention was made with Government support under contract N00014-87-C-0515 awarded by the Office of Naval Research, Dept. of the navy. The Government has certain rights in the invention.

BACKGROUND OF THE INVENTION

Hot pressing is a well-known method for densifying ceramic materials. Typically, a green ceramic to be densified is placed into a die as a powder or preform. Heat and pressure are then applied to the ceramic to cause the ceramic to densify.

The atmosphere used during hot pressing may vary according to the ceramic composition being pressed. Alumina and alumina-based ceramic composites are often pressed in air or other oxygen-containing atmospheres.

For hot pressing certain alumina composites such as those produced by reaction processing techniques, there may be inadequate grain boundary mobility within the composite to allow for breakdown of large inhomogeneities often present in those composites. Accordingly, hot pressed alumina composites of the prior art may be apt to contain large voids which degrade the mechanical properties of the composite.

Thus, there exists a need to facilitate the breakup of such large voids and to generally promote more complete densification under less severe hot pressing conditions for alumina-containing ceramics in general.

SUMMARY OF THE INVENTION

The present invention provides an advancement in the hot-pressing of alumina-based ceramics by providing a densification aid which promotes densification and the breakdown of large voids. This densification aid, namely boron compound capable of forming boron oxide, is particularly effective in air hot pressing processes.

In one aspect, the invention encompasses a method of hot pressing an alumina-containing material comprising:
(a) combining a source of alumina and a source of boron compound capable of forming boron oxide to form a mixture;
(b) forming the mixture into a shape; and
(c) hot pressing the shape in an oxygen-containing atmosphere to densify the shape.

In another aspect, the invention embraces a method of hot pressing an alumina-containing material comprising:
(a) forming an alumina-containing shape; and
(b) contacting the shape with a boron compound capable of forming boron oxide;
(c) hot pressing the shape while said shape is in contact with the boron compound to sinter the shape.

Preferred embodiments include hot pressing in an air atmosphere. The boron compound is preferably selected from the group consisting of metal borides, silicon boride, boron nitride, and boron carbide.

DETAILED DESCRIPTION OF THE INVENTION

The invention processes involve using a boron compound, capable of forming boron oxide on hot pressing in an oxygen-containing atmosphere, as a sintering aid for hot pressing alumina-based ceramics. The boron compound may be included as part of the body to be densified or it may be placed in contact with a substantial portion of the body to be densified.

The basic hot pressing process involves placing an alumina-containing powder or preform into a hot press die (usually a graphite die). The alumina-containing material is then densified by application of heat and pressure.

The starting material being hot pressed may include any known alumina-based ceramic powder. The material may also include various other ingredients such as compatible binders, sintering aids or inert materials.

Alternatively, the starting material may be a mixture of reactants adapted to yield an alumina-based composition at elevated temperatures (i.e., by reaction processing). An example of such a starting material is a mixture of aluminum powder, silica and carbon powder which can be reacted to form a mixture of alumina and silicon carbide. Such starting material may also include binders, inert materials or sintering aids.

In certain instances, it may also be desirable to add silica to the material to be hot pressed so as to increase the viscosity of intergranular phase material during the hot pressing.

The boron compound may be incorporated into the starting material. In such case, the amount of boron compound present is preferably at least about 0.1-1 wt. % based on the alumina content of the hot pressed material, more preferably about 0.5 wt. %.

The boron compound may also be placed in contact with the material to be hot pressed to achieve the densification assisting effect of the invention. This manner of using boron compound may be used instead of or in addition to the direct incorporation of boron compound into the starting material.

This externally applied boron compound may be in the form of a sprayed coating, a paint, or preformed sheets placed in contact with the material to be hot pressed. These modes of application or others may be used alone or in combination. Preferably, the externally applied boron compound uniformly contacts the majority of the material's outer surface.

The boron compound is preferably a compound capable of forming boron oxide on hot pressing in an oxygen-containing atmosphere. Preferred boron compounds are:
a) transition metal borides, such as $TiB_2$, $CrB$, $CrB_2$, $Cr_5B_3$, $HfB_2$, $NbB_2$, $TaB_2$, $MoB_2$, $WB$, $ZrB_2$ and $ZrB_{12}$,
b) boron nitride,
c) boron carbide,
d) other metal borides, such as $AlB_2$, $AlB_{12}$, $CaB_6$, and $MgB_2$,
e) silicon boride, and
f) rare earth borides, such as $LaB_6$.

Preferably, boron oxide formation does not occur at too low a temperature otherwise the oxide may volatilize or flow out of the press before the densification process begins. Boron nitride is a preferred boron compound.

The hot pressing may be done in any conventional manner. The hot pressing atmosphere used should contain an adequate partial pressure of oxygen to ensure the effectiveness of the boron compound sintering aid. An oxygen partial pressure of at least $10^{-13}$ atm is preferred. Ordinary air can be used as the hot pressing atmosphere.

The hot pressing temperature is preferably at least about 1400° C., more preferably at least about 1650° C.

The pressure is preferably at least about 1300 psi, more preferably at least about 1500 psi. The hot pressing time will vary depending on the temperature and pressure conditions selected as well as the nature of the starting material. Typical hot pressing times are usually about one hour or more. For reaction-processed starting materials, the reacting may be conducted as a separate process step or during the heat up to hot pressing temperature.

The invention will be illustrated by the following example. It should be understood that the invention is not limited to the specifics of the Example.

EXAMPLE 0.5 wt. % BN powder was milled into a mixture of aluminum powder, silica powder and carbon powder using isopropanol as the milling fluid. The aluminum, silica and carbon were present in approximately stoichiometric proportions according to the reaction:

$$4 Al + 3 SiO_2 + 3 C \rightarrow 2 Al_2O_3 + 3 SiC.$$

The mixture was filtered and dried.

The dried mixture was placed into a graphite hot pressing die lined with graphite paper. The mixture was then air hot pressed at about 1650° C. and 1500 psi for about one hour. The reaction forming the alumina occurred during the heat up to 1650° C. The resulting $AlO_3$-SiC composite had a density of about 3.43 g/cc and about 0.8% open porosity measured by the Archimedes method. Similar mixtures processed in this manner without BN resulted in densities of only about 2.52–2.88 g/cc.

We claim:

1. A method of hot pressing an alumina-containing material comprising:
   (a) combining a source of alumina and a source of boron compound to form a mixture, said boron compound being capable of forming boron oxide on hot pressing in an oxygen-containing atmosphere;
   (b) forming said mixture into a shape; and
   (c) hot pressing said shape in an oxygen-containing atmosphere to form boron oxide and to densify said shape.

2. The method of claim 1 wherein said mixture consists essentially of alumina, said boron compound, and a binder.

3. The method of claim 1 wherein the mixture contains about 0.1–1.0% of said boron compound based on the weight of alumina in the hot pressed shape.

4. The method of claim 3 wherein said boron compound is selected from the group consisting of $TiB_2$, CrB, $CrB_2$, $Cr_5B_3$, $HfB_2$, $TaB_2$, $TaB_2$, $MoB_2$, WB, $ZrB_2$, $ZrB_{12}$, BN, $B_4C$, $AlB_2$, $AlB_{12}$, $CaB_6$, $MgB_2$, $SiB_6$ and $LaB_6$.

5. The method of claim 4 wherein said boron compound is boron nitride.

6. The method of claim 1 wherein said hot pressing is performed at a pressure of at least about PSI.

7. The method of claim 1 wherein said hot pressing is performed at about 1650° C. and about 1500 PSI for about one hour.

8. The method of claim 1 wherein said hot pressing is performed in an air atmosphere.

9. A method of hot pressing an alumina-containing material comprising:
   (a) forming an alumina-containing shape;
   (b) contacting said shape with a boron compound capable of forming boron oxide on hot pressing in an oxygen-containing atmosphere; and
   (c) hot pressing said shape in an oxygen-containing atmosphere, while said shape is in contact with said boron compound, to form boron oxide and to densify said shape.

10. The method of claim 9 wherein said mixture consists essentially of alumina and a binder.

11. The method of claim 9 wherein said boron compound is selected from the group consisting of $TiB_2$, CrB, $CrB_2$, $Cr_5B_3$, $HfB_2$, $NbB_2$, $TaB_2$, $MoB_2$, WB, $ZrB_2$, $ZrB_{12}$, BN, $B_4C$, $AlB_2$, $AlB_{12}$, $CaB_6$, $MgB_2$, $SiB_6$ and $LaB_6$.

12. The method of claim 11 wherein said boron compound is boron nitride.

13. The method of claim 9 wherein said hot pressing is performed at about 1650° C. and about 1500 PSI for about one hour.

14. The method of claim 9 wherein said hot pressing is performed in an air atmosphere.

15. The method of claim 1 wherein the mixture contains reactants which react to form alumina on heating and wherein the reaction occurs prior to said densification.

16. The method of claim 9 wherein said forming of step (a) includes:
   (i) forming a mixture of reactants capable of reacting to form alumina, and
   (ii) shaping said mixture and heating said shape to cause said reaction.

17. The method of claim 16 wherein said contacting of step (b) occurs as said alumina-forming reaction takes place.

18. The method of claim 1 wherein said mixture additionally contains silica.

19. The method of claim 9 wherein said shape additionally contains silica.

20. The method of claim 15 wherein said mixture of reactants contains free aluminum, free carbon and silica.

* * * * *